United States Patent [19]

Brown

[11] Patent Number: 6,011,109
[45] Date of Patent: Jan. 4, 2000

[54] WEAR-RESISTANT TRAFFIC MARKING COMPOSITION

[75] Inventor: Ward Thomas Brown, North Wales, Pa.

[73] Assignee: Rohm and Haas Company, Philadelphia, Pa.

[21] Appl. No.: 09/063,563

[22] Filed: Apr. 20, 1998

Related U.S. Application Data

[60] Provisional application No. 60/043,937, Apr. 22, 1997.

[51] Int. Cl.$^7$ ..................................................... C08L 83/00
[52] U.S. Cl. ........................... 524/588; 524/589; 524/590; 524/591
[58] Field of Search ..................... 524/588, 589, 524/590, 591

[56] References Cited

U.S. PATENT DOCUMENTS

| | | | |
|---|---|---|---|
| 5,041,494 | 8/1991 | Franke et al. | 524/588 |
| 5,075,370 | 12/1991 | Kubitza et al. | 524/591 |
| 5,236,982 | 8/1993 | Cossement et al. | 524/188 |
| 5,414,041 | 5/1995 | Larson et al. | 524/589 |
| 5,519,089 | 5/1996 | Okamoto et al. | 525/123 |

FOREIGN PATENT DOCUMENTS

| | | |
|---|---|---|
| 0524500 A1 | 1/1993 | European Pat. Off. . |
| 0537568 A2 | 4/1993 | European Pat. Off. . |
| 665252 | 8/1995 | European Pat. Off. . |

*Primary Examiner*—Erma Cameron
*Attorney, Agent, or Firm*—Ronald D. Bakule, Patent Agent

[57] ABSTRACT

Aqueous wear-resistant traffic marking compositions which include an aqueous emulsion polymer having at least two functional groups reactive with isocyanate, an alkoxysilane having at least one functional group reactive with isocyanate, and a polyisocyanate are provided. Also provided is a method for producing a wear-resistant traffic marking on a road surface.

4 Claims, No Drawings

WEAR-RESISTANT TRAFFIC MARKING COMPOSITION

This appl. claims benefit of Provisional Appl. Ser. No. 60/043,937 filed Apr. 22, 1997.

The present invention relates to coating compositions, in particular wear-resistant traffic marking compositions and a method for producing wear-resistant traffic marking compositions. In particular, the present invention relates to aqueous traffic-marking compositions which include an aqueous emulsion polymer having at least two functional groups reactive with isocyanate, an alkoxysilane having at least one functional group reactive with isocyanate and a polyisocyanate.

Traffic marking paints are applied to roads, parking lots, and the like, typically concrete and asphaltic surfaces, to instruct users and to demarcate traffic lanes, parking spaces, and the like. As the replacement of solvent-borne paints continues in order to minimize air pollution, aqueous traffic marking compositions having a useful level of dried film properties have been sought. One of the most important properties of traffic marking compositions is the wear-resistance of the dried coating under use conditions, i.e., the useful lifetime of the composition.

U.S. Pat. No. 5,519,089 discloses a two-pack aqueous coating composition including an alkoxysilane-containing, water-dispersible acrylic copolymer and a polyisocyanate. The use of the coating composition is disclosed to form films which excel in resistance properties and physical properties. The alkoxy silane content of the acrylic copolymer is fixed once the polymer is formed. Further, reaction of the alkoxysilane prior to film formation produces precrosslinked polymer which may inhibit effective film formation.

The present invention provides a wear-resistant traffic marking composition and a method for producing wear-resistant traffic markings. The composition has the advantage of containing three components which may be independently varied, as required, to provide a useful traffic marking.

According to a first aspect of the present invention there is provided aqueous traffic-marking composition which includes an aqueous emulsion polymer having at least two functional groups reactive with isocyanate, an alkoxysilane having at least one functional group reactive with isocyanate and a polyisocyanate.

According to a second aspect of the present invention there is provided a method for producing wear-resistant traffic markings including forming an aqueous traffic-marking composition by admixing an aqueous emulsion polymer having at least two functional groups reactive with isocyanate, an alkoxysilane having at least one functional group reactive with isocyanate and a polyisocyanate; and applying the composition to a substrate.

The aqueous emulsion polymer is an addition polymer having at least two functional groups reactive with isocyanate, the polymer formed by the aqueous emulsion polymerization of ethylenically-unsaturated monomers. The aqueous emulsion polymer composition may be selected and the polymer prepared by conventional techniques known to those generally skilled in the art. The polymer may contain one or more of the following copolymerized ethylenically unsaturated monomers such as, for example, $C_1$–$C_{22}$ linear or branched chain alkyl (meth)acrylates, bornyl (meth) acrylate, isobornyl (meth)acrylate, and the like; hydroxyethyl (meth)acrylate, hydroxypropyl (meth)acrylate; (meth) acrylamide or substituted (meth)acrylamides; styrene or substituted styrenes; butadiene; vinyl acetate or other vinyl ester; butylaminoethyl (meth)acrylate, di(methyl) aminoethyl (meth)acrylate; a monomer containing a $\alpha$, $\beta$-unsaturated carbonyl functional groups such as fumarate, maleate, cinnamate and crotonate; and (meth)acrylonitrile. Optionally, a low level of a copolymerized acid-functional monomer such as, for example, 0–10% by weight based on the weight of the dry emulsion polymer of (meth)acrylic acid, itaconic acid, crotonic acid, phosphoethyl (meth) acrylate, fumaric acid, maleic anhydride, monomethyl maleate, and maleic acid may be used. Optionally, a low level of a multi-ethylenically unsaturated monomer such as, for example, 0–5% by weight based on the weight of the dry emulsion polymer of allyl (meth)acrylate, diallyl phthalate, 1,4-butylene glycol di(meth)acrylate, 1,6-hexanediol-di (meth)acrylate, and trimethylolpropane tri(methyl)acrylate may be used subject to maintaining a sufficiently low level of crosslinking that effective film formation is not compromised Preferred functional groups reactive with isocyanate incorporated in the aqueous emulsion polymer are hydroxy groups and 1,3-dicarbonyl groups. The preferred level of hydroxy group-containing monomers such as, for example, hydroxyethyl (meth)acrylate and hydroxypropyl (meth) acrylate is 0.1 to 40%, by weight based on dry emulsion polymer weight; more preferred is 1 to 20%, by weight based on dry emulsion polymer weight; most preferred is 3 to 8%, by weight based on dry emulsion polymer weight. The preferred level of 1,3-dicarbonyl group-containing monomers such as, for example, acetoacetoxyethyl(meth) acrylate is 0.1 to 40%, by weight based on dry emulsion polymer weight; more preferred is 1 to 20%, by weight based on dry emulsion polymer weight; most preferred is 8 to 12%, by weight based on dry emulsion polymer weight.

For the polyisocyanate, water dispersible or self-emulsifing polyisocyanates are preferred. By "polyisocyanate"herein is meant a composition bearing at least two isocyanate groups and, optionally, other functional groups. The polyisocyanate may contain aliphatically, cycloaliphatically, araliphatically and/or aromatically bound isocyanate groups. Suitable water-dispersible isocyanates and methods of making aqueous dispersion of isocyanates therefrom are described in U.S. Pat. Nos. 4,663,337; 5,075, 370; 5,185,200; 5,200,489; and 5,252,696; and European Patent Applications EP 486,881 and EP 516, 277. Preferred is an aqueous dispersion of a polyisocyanate bearing two to four reactive isocyanate groups.

Preferred is a ratio of isocyanate groups of the polyisocyanate to groups reactive with isocyanate of the aqueous emulsion polymer on a molar basis of 1:10 to 10:1, more preferred is 1:3 to 3:1, most preferred is 1:1 to 2:1.

The alkoxysilane having at least one functional group reactive with isocyanate is any compound which contains at least one Si—O—C group and at least one Si—C—X group, where X is an isocyanate-reactive group or an organic residue which contains an isocyanate-reactive group. Preferred as isocyanate-reactive groups for the alkoxysilane are amino, mercapto, and hydroxy groups. Preferred isocyanate-reactive alkoxysilanes include N-(2-aminoethyl)-3-aminopropylmethyldimethoxysilane, N-(2-aminoethyl)-3-aminopropyltrimethoxysilane,
3-aminopropylmethyldiethoxysilane,
3-aminopropyltriethoxysilane,
3-aminopropyltrimethoxysilane,
N-methylaminopropyltrimethoxysilane,
trimethoxysilylpropyldiethylenetriamine,
3-aminopropylmethoxydi(trimethylsiloxy)silane, bis(2-hydroxyethyl)-3-aminopropyltriethoxysilane,
3-hydroxypropyltrimethoxysilane, 3-mercaptopropylmethyldimethoxysilane, and 3-mercaptopropyltrimethoxysilane. Preferred is from 0.01 to 10% alkoxysilane, by weight based on emulsion polymer dry weight; more preferred is 0.1 to 5% alkoxysilane, by weight based on emulsion polymer dry weight; most preferred is 1 to 2% alkoxysilane, by weight based on emulsion polymer dry weight.

The aqueous traffic-marking composition may be free of organic solvent or it may contain a coalescing solvent. The composition may contain typical coating additives such as binders, fillers, defoamers, cross-linkers, catalysts, surfactants, stabilizers, anti-flocculants, aqueous or non-aqueous solutions or dispersions of non-reactive polymer (by "non-reactive polymer" herein is meant polymer substantially free from isocyanate or isocyanate-reactive groups), tackifiers, coalescents, colorants, waxes, antioxidants, and pigments.

The aqueous traffic-marking composition may be formed by admixing an aqueous emulsion polymer having at least two functional groups reactive with isocyanate, an alkoxysilane having at least one functional group reactive with isocyanate and a polyisocyanate using conventional mixing techniques as mechanical agitation such as, for example, stirring using a motor-driven stirring blade. The polyisocyanate or the alkoysilane may be previously dispersed in a non-reactive or in an aqueous medium or it may be dispersed in the presence of the aqueous polymer dispersion. As the composition is expected to react, i.e., to provide a crosslinked polymeric film, it is advantageous to maintain the composition as a two component or two package system, admixing shortly before use. Pot-lifes are typically 5 minutes to 4 hours at 25° C. Preferred is providing one package including the aqueous emulsion polymer, the alkoxysilane, and, optionally, pigment and other coating additives and a second package containing the isocyanate.

The aqueous traffic-marking composition may be applied to roads, parking lots, and the like, typically to concrete and asphaltic surfaces. The traffic-marking composition of this invention may be applied by methods well known in the art such as air-assisted spray, airless spray, plural component spray, brush, roller squeege, and the like.

After the crosslinkable composition is applied to a substrate the composition dries or is causeed to dry. Drying to yield useful properties may take place at a convenient rate at ambient temperatures such as, for example, from 0° C. to 35° C.

EXAMPLE 1

Preparation of Aqueous Emulsion Polymer Having at Least Two

Functional Groups Reactive with Isocyanate (Hydroxyl Groups)

To 760 g of deionized (DI) water under a nitrogen atmosphere at 90° C. were added with stirring, 7.8 g ammonium bicarbonate dissolved in 50 g DI water, 5.2 g ammonium persulfate dissolved in 50 g DI water, and 157 g polymer seed latex (solids content 41.5%) followed by 30 g of DI water to form a reaction mixture to which the following monomer mixture was added over 3 hours at 81° C. along with a solution of 2.6 g ammonium persulfate dissolved in 100 g DI water.

| Monomer mixture: | in grams (g) |
|---|---|
| DI water | 680 |
| sodium lauryl sulfate | 8.7 |
| butyl acrylate | 993.6 |
| methyl methacrylate | 1030.3 |
| hydroxyethyl methacrylate (HEMA) | 108.0 |
| methacrylic acid | 28.1 |

At the end of the feeds 0.01 g of FeSO4 dissolved in 8.8 g of DI water, 0.01 g of the tetrasodium salt of ethylenediamine tetraacetic acid dissolved in 0.9 g DI water, 1.8 g of t-butylhydroperoxide (70% active ingredient) in 20 g DI water, and 0.6 g of isoascorbic acid in 20 g DI water were added to the reaction product which was then neutralized with ammonium hydroxide. The final product had a solids content of 53.4%, a Brookfield viscosity of 404 cps (spindle 3 at 60 rpm using a Brookfield Model LVTD viscometer), particle size 193 nm (particle diameters herein measured using a Brookhaven Model BI-90 Particle Sizer), and pH 10.4.

EXAMPLE 2

Preparation of Aqueous Emulsion Polymer Having at Least Two

Functional Groups Reactive with Isocyanate (Hydroxyl Groups)

Example 2 was prepared according to the method of Example 1 except for the following monomer mixture.

| Monomer mixture: | in grams (g) |
|---|---|
| DI water | 680 |
| sodium lauryl sulfate | 8.7 |
| butyl acrylate | 993.6 |
| methyl methacrylate | 1030.3 |
| hydroxyethyl methacrylate (HEMA) | 108.0 |
| methacrylic acid | 28.1 |
| n-dodecylmercaptan | 27.0 |

The final product had a solids content of 53.5%, a Brookfield viscosity of 428 cps (spindle 3 at 60 rpm using a Brookfield Model LVTD viscometer), particle size 191 nm, and pH 10.4.

EXAMPLE 3

Preparation of Aqueous Emulsion Polymer Having at Least Two

Functional Groups Reactive with Isocyanate (Hydroxyl Groups)

Example 3 was prepared according to the method of Example 1 except for the following monomer mixture.

| Monomer mixture: | in grams (g) |
|---|---|
| DI water | 680 |
| sodium lauryl sulfate | 8.7 |
| butyl acrylate | 864.0 |

-continued

| Monomer mixture: | in grams (g) |
|---|---|
| methyl methacrylate | 835.9 |
| hydroxyethyl methacrylate (HEMA) | 432.0 |
| methacrylic acid | 28.1 |

The final product had a solids content of 53.5%, a Brookfield viscosity of 624 cps (spindle 3 at 60 rpm using a Brookfield Model LVTD viscometer), particle size 211 nm, and pH 10.3.

EXAMPLE 4

Preparation of Aqueous Emulsion Polymer Having at Least Two

Functional Groups Reactive with Isocyanate (1,3-dicarbonyl Groups)

To 841 g of deionized (DI) water under a nitrogen atmosphere at 90° C. were added with stirring, 7.6 g ammonium bicarbonate dissolved in 50 g DI water, 5.4 g ammonium persulfate dissolved in 50 g DI water, and 157 g polymer seed latex (solids content 41.5%) followed by 30 g of DI water to form a reaction mixture to which the following monomer mixture was added over 3 hours at 81° C. along with a solution of 2.2 g ammonium persulfate dissolved in 100 g DI water.

| Monomer mixture: | in grams (g) |
|---|---|
| DI water | 680 |
| sodium lauryl sulfate | 8.7 |
| butyl acrylate | 883.4 |
| methyl methacrylate | 1075.7 |
| acetoacetoxyethyl methacrylate (AAEM) | 172.8 |
| methacrylic acid | 28.1 |

At the end of the feeds 0.01 g of FeSO4 dissolved in 9.1 g of DI water, 0.5 g of the tetrasodium salt of ethylenediamine tetraacetic acid dissolved in 10 g DI water, 1.8 g of t-butylhydroperoxide (70% active ingredient) in 20 g DI water, and 0.6 g of isoascorbic acid in 20 g DI water were added to the reaction product which was then neutralized with ammonium hydroxide. The final product had a solids content of 51.6%, a Brookfield viscosity of 100 cps (spindle 3 at 60 rpm using a Brookfield Model LVTD viscometer), particle size 189 nm, and pH 9.9.

EXAMPLE 5

Preparation of Aqueous Emulsion Polymer Having at Least Two

Functional Groups Reactive with Isocyanate (1,3-dicarbonyl Groups).

Example 5 was prepared according to the method of Example 4 except for the following.

| Monomer mixture: | in grams (g) |
|---|---|
| DI water | 680 |
| sodium lauryl sulfate | 8.7 |
| butyl acrylate | 775.4 |
| methyl methacrylate | 924.5 |
| acetoacetoxyethyl methacrylate (AAEM) | 432.0 |
| methacrylic acid | 28.1 |

The final product had a solids content of 50.7%, a Brookfield viscosity of 92 cps (spindle 3 at 60 rpm using a Brookfield Model LVTD viscometer), particle size 192 nm, and pH 10.4.

EXAMPLE 6

Preparation of Traffic-marking Compositions

Traffic-marking compositions (TMC 1–7) and Comparative Samples A–B were prepared according to the following formulations. The ingredients were added in the order given under low shear laboratory mixing. After the addition of the Omyacarb®-5, stirring was continued for 15 minutes before the addition of the remaining ingredients. The ingredients used in the preparation of intermediate base paints P1–P5 are presented in Table 6.1. The intermediate base paints were then used in the preparation of traffic marking compositions TMC-1 to TMC-7 and Comparative Samples A–B, the ingredients, presented in Table 6.2, were added in the order given under low shear laboratory mixing.

TABLE 6.1

Ingredients for intermediate base paint compositions P1–P5 for use in traffic marking compositions.

| Base Paint | P1 | P2 | P3 | P4 | P5 |
|---|---|---|---|---|---|
| Emulsion polymer (solids as supplied) | 273.4 g Example 1 | 136.7 g Example 2 | 136.7 g Example 3 | 136.7 g Example 4 | 136.7 g Example 5 |
| Polymer Functional Group | 4.85 wt. % HEMA | 4.85 wt. % HEMA | 19.4 wt. % HEMA | 7.77 wt. % AAEM | 19.4 wt. % AAEM |
| Victawet ® 35-B | 4.8 | 2.4 | 2.4 | 2.4 | 2.4 |
| Drew L-493 | 3.0 | 1.5 | 1.5 | 1.5 | 1.5 |
| TiPure ® R-900 | 60.0 | 30.0 | 30.0 | 30.0 | 30.0 |
| Omyacarb ®-5 | 384.0 | 192.0 | 192.0 | 192.0 | 192.0 |
| MeOH | 6.0 | 3.0 | 3.0 | 3.0 | 3.0 |
| KP-140 | 3.0 | 1.5 | 1.5 | 1.5 | 1.5 |
| Water | 54.2 | 24.0 | 42.2 | 55.1 | 36.0 |

TABLE 6.2

Ingredients used in the preparation of traffic marking compositions TMC-1 to TMC-7 and Comparative Samples A–B.

| TMC- | 1 | Comp A | 2 | 3 | 4 | 5 | 6 | Comp B | 7 |
|---|---|---|---|---|---|---|---|---|---|
| Base Paint | 100 g P1 | 100 g P1 | 100 g P1 | 100 g P2 | 100 g P3 | 100 g P3 | 100 g P4 | 100 g P4 | 100 g P5 |
| A0700* | 1.04 | 0 | 1.04 | 1.12 | 2.14 | 2.14 | 0.33 | 0 | 1.03 |
| XP-7063# | 2.45 | 2.45 | 4.89 | 2.64 | 10.06 | 3.35 | 2.29 | 2.29 | 5.91 |

*25% in $H_2O$; aminoethylaminopropyl trimethoxysilane
100% solids as supplied; polyisocyanate
Notes:
1) All quantities are in grams unless otherwise specified.
2) Raw materials suppliers:
Victawet ®35-B Akzo Chemicals Inc., Chemical Divisson, Chicago, IL 60606
A0700 United Chemical Technologies, Inc., Petrarch Silanes and Silicones, 2731 Bartram Road, Bristol, PA 19007
Bayhydur ®XP-7063 Bayer Corp., 100 Bayer Rd., Pittsburgh, PA 15205
KP-140 FMC Corp., Phosphorus Chemicals Division, 2000 Market St., Philadelphia, PA 19103

EXAMPLE 7

Testing of Wear Resistance of Applied Traffic Marking Composition

Test panels were prepared by spraying coatings of traffic marking compositions or comparative samples onto very smooth concrete with no exposed agregate (product of Patio Concrete Co., panels preconditioned with 200k wet cycles in the Trafficometer wear tester before coating) using conventional air apray to a wet film thickness of 0.38 mm. (15 mils). The coatings were dried at room temperature for 16 hours prior to wear testing.

The wear test measures the durability or wear resistance of a coating under accelerated conditions by contacting the surface repeatedly with rolling wear wheels under pressure through a curved path. The panel is cycled between wet and dry testing; the number of cumulative rotations of the Trafficometer wheel dolly in listed for each panel rating in 1000's of rotations. The Trafficometer device is described in Copending U.S. Provisional Patent Application Ser. No. 60/029,973. Wear data is presented in Tables 7.1 and 7.2 in the form: L % W", where L % is the percent of coating lost in an arc W" wide. Panel is cycled between wet and dry testing; the number of cumulative rotations of the Trafficometer wheel dolly in listed for each panel rating in 1000's(k) of rotations. No entry indicates that no wearthrough of the coating was observed.

TABLE 7.1

Wear Testing Results

| TMC- | TMC-1 | Comp. A | TMC-2 | Comp. P1 | TMC-3 | TMC-4 |
|---|---|---|---|---|---|---|
| Emulsion Functionality | 5 HEMA | 5 HEMA | 5 HEMA | 5 HEMA | 5 HEMA low MW | 20 HEMA |
| % A0700 | 1½ | 0 | 1½ | 0 | 1½ | 3 |
| NCO stoich. | 1½:1 | 1½:1 | 3½:1 | 0:1 | 1½:1 | 1½:1 |
| wet 1.2 k | | | | 5% ½" | | |
| 3.3 k | | 5% ¼" | | 80% ½" | | |
| 6.4 k | | 25% ½" | | 100% ½" | | |
| 18.8 k | | 100% ½" | | | | |
| 30.7 k | | | | | | |
| 191 k | | | | | | |
| dry 239 k | | | | | | |
| wet 653 k | | | | | | |

NCO stoich. = moles NCO:moles HEMA (or AAEM). % A0700 is based on resin solids.

TABLE 7.2

Wear Testing Results

| Paint # | TMC-5 | TMC-6 | Comp. B | Comp P4 | TMC-7 |
|---|---|---|---|---|---|
| Emulsion Functionality | 20 HEMA | 8 AAEM | 8 AAEM | 8 AAEM | 20 AAEM |
| % A0700 | 3 | ½ | 0 | 0 | 1½ |
| NCO stoich. | ½:1 | 1½:1 | 1½:1 | 0:1 | 1½:1 |
| wet 1.2 k | | | | 70% ½" | |
| 3.3 k | | | | 100% ½" | |
| 6.4 k | | | | | |
| 18.8 k | | | 10% ½" | | |
| 30.7 k | | | 20% ½" | | |
| | | | " | | |

TABLE 7.2-continued

| | Wear Testing Results | | | | |
|---|---|---|---|---|---|
| Paint # | TMC-5 | TMC-6 | Comp. B | Comp P4 | TMC-7 |
| 191 k | | | 25% ½" | | |
| dry 239 k | | | " | | |
| wet 653 k | | | 30% ½" | | |

NCO stoich. = moles NCO: moles HEMA (or AAEM). % A0700 is based on resin solids.

Compositions TMC-1 to TMC-7 of this invention exhibit superior wear resistance to Comparatives A, B, P1, and P4.

I claim:

1. An aqueous traffic marking composition comprising (1) an aqueous emulsion polymer having at least two functional groups reactive with isocyanate, (2) an alkoxysilane having at least one functional group reactive with isocyanate, and (3) a polyisocyanate.

2. The aqueous traffic marking composition of claim 1 wherein said emulsion polymer comprises 0.1% to 40%, by weight based on dry emulsion polymer weight, copolymerized ethylenically unsaturated monomer, said monomer having at least one group reactive with isocyanate.

3. The aqueous traffic marking composition of claim 1 wherein the ratio of equivalents of isocyanate to equivalents of functional group reactive with isocyanate is from 1 to 10 to 10 to 1.

4. The aqueous traffic marking composition of claim 1 wherein said alkoxysilane comprises 0.1% to 10%, alkoxysilane having at least one hydroxy, mercapto, or amino group, by weight based on emulsion polymer dry weight.

* * * * *